United States Patent [19]

Figueroa

[11] 3,938,628
[45] Feb. 17, 1976

[54] DISC BRAKE ASSEMBLY

[76] Inventor: Antonio Casas Figueroa, Apartado 3210, San Jose, Costa Rica

[22] Filed: Dec. 12, 1974

[21] Appl. No.: 532,168

[52] U.S. Cl............... 188/18 A; 188/71.1; 188/71.5; 188/80
[51] Int. Cl.² ...................... B60T 1/06; F16D 55/40
[58] Field of Search .......... 188/18 A, 71.1, 71.5, 80

[56] References Cited

UNITED STATES PATENTS

| | | | |
|---|---|---|---|
| 2,128,013 | 8/1936 | Parnell............................. | 188/80 X |
| 3,482,654 | 12/1969 | Akeel................................ | 188/71.5 |

*Primary Examiner*—George E. A. Halvosa
*Attorney, Agent, or Firm*—Stein & Orman

[57] ABSTRACT

A disc brake assembly of the type used primarily in an automobile or like motor vehicle environment and including a disc member attached to the wheel, and a lining and lining assembly disposed immediately adjacent the disc for frictional engagement therewith. The lining is interconnected to a lining support element in the form of a rotatable hub wherein the lining itself and the hub are rotationally and linearly movable relative to one another such that frictional engagement between the lining and the disc occurs when the disc and the lining are moving in the opposite rotational directions to accomplish maximum frictional engagement and accordingly, more efficient braking action on the wheel to which the disc is attached.

4 Claims, 5 Drawing Figures

DISC BRAKE ASSEMBLY

BACKGROUND OF THE INVENTION

1. Field of the Invention

This invention relates to a disc assembly of the type primarily used on a wheel for an automobile or like motor vehicle wherein the brake lining is movable into and out of frictional engagement with the disc attached to the wheel and further wherein the lining is capable of independent movement relative to the disc so as to accomplish increased frictional engagement therebetween in order to increase the braking action between the lining and the disc and connected wheel.

2. Description of the Prior Art

The majority of prior art braking assemblies utilized for motor vehicle applications included a shoe-type brake which generally is internally expanded and hydrolically operated. However, the disc brake structure has become increasingly popular in such application due to its more efficient operation and more desirable performance characteristics.

Prior art and/or currently, commercially available disc brakes normally comprise a partial disc structure in which an annular brake disc is attached to a rotating wheel and is gripped by oppositely disposed arms having circular or kidney-shaped brake pads with frictional lining thereon and disposed to frictionally engage the disc located between the arms. The frictional engagement, of course, serves to retard the rotation of the wheel and cause the braking action on the vehicle. Such disc brake structures are commonly known as caliper-type brakes.

Problems resulting in the use and operation of this type of brake assembly include the inadequate dissipation of heat which is rapidly generated due to the frictional engagement between the shoe and/or lining and the disc itself. The presence of fading in a brake assembly is, of course, dangerous and various types of brake designs have been attempted in order to eliminate this problem. Another major problem recognized in the brake industry is the providing of sufficient force on the disc to provide sufficient braking action so that the brake structure can be used on heavy vehicles including airplanes, trucks, and the like. In order to accomplish sufficient force being exerted on the disc, it is academic that sufficient friction be created between the brake lining and the disc itself. In an attempt to accomplish the creation of sufficient frictional engagement, prior art devices have utilized a plurality of pistons or like structures so as to force the brake lining into engagement with the correspondingly positioned brake disc. However, problems have arisen in the design and construction of these prior art brake assemblies due to the fact that the actuating piston cannot be made sufficiently large enough to apply the proper amount of force to the brake shoes so as to provide braking action between the lining and the disc. In the above noted prior art devices it is also common to maintain the lining in a relatively fixed position relative to the rotational movement of the disc which is attached to the wheel being braked. Frictional engagement and resulting braking action occurs by linearly moving the lining into frictional engagement with the corresponding positioned surface of the disc. While such prior art brake structures are certainly operable, the amount of friction created between the lining and the disc itself is generally not sufficient for heavy duty use as set forth above over a reasonable operable life.

SUMMARY OF THE INVENTION

The present invention is directed to a disc-type brake assembly primarily designed for the braking of wheels mounted on automobiles or like motor vehicles.

More specifically, a disc member is fixedly attached to rotate with the wheel itself and is positioned in spaced, but operable engagement with a lining means disposed to selectively, frictionally engage the correspondingly positioned surface of the disc.

The lining assembly is mounted on a lining support means in the form of a hub member which itself is fixedly attached to the axle on which the wheel assembly is mounted. As in conventional design, rotation of the axle causes the wheel assembly to, of course, rotate, and the disc attached thereto to rotate. By virtue of the fact that the hub member comprising the lining support means is also mounted to the axle, the hub means will rotate along with the wheel assembly and disc. A lining movement means is interconnected between the lining assembly and the lining support means. This lining movement means comprises a hub gear correspondingly configured to the splined configuration of the hub member and disposed in concentric, intermeshing relation thereto. The lining movement means further comprises a ring gear disposed in outwardly concentric relation to the hub gear and interconnected thereto by a plurality of planetary gears rotatably mounted on the lining assembly itself and serving to movably drive the outer ring gear and the remaining portion of the lining assembly attached thereto by virtue of the driving rotation of the hub ring gear.

Specifically, upon rotation of the axle, the hub and the attached hub ring gear rotates in a given direction. This given direction of rotation causes the outer ring gear to be driven in the opposite direction which, in turn, causes a constant relative rotational movement in opposite directions between the lining means and the disc means. It can readily be seen that when the lining means is brought into direct frictional engagement with the disc means an obviously greater amount of friction is created between the lining means and the surface of the disc means which it engages due to the fact that the disc means and the lining means are rotating in opposite directions. This, in turn, of course creates a greater amount of braking force on the wheel and further, provides greater performance characteristics as well as the ability for the brake assembly of the subject invention to be used with heavy duty applications such as trucks, airplanes, and the like.

An operative means is interconnected between a source of fluid and the outer casing of the lining assembly itself. The operative means comprises one or more fluid activated piston and cylinder assemblies attached to a bearing assembly which, in turn, is attached to an outer connecting plate of the lining assembly. Activation of the operative means through relative movement between the piston and cylinders of each piston and cylinder assembly causes linear movement of the lining assembly and the attached lining means into and out of operative frictional engagement with the correspondingly positioned surface of the disc means.

It is seen, therefore, that the lining assembly and the attached lining means is capable of both rotational movement in a direction opposite to that of the rotational movement of the disc means and linear movement into and out of operative frictional engagement with the disc means.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
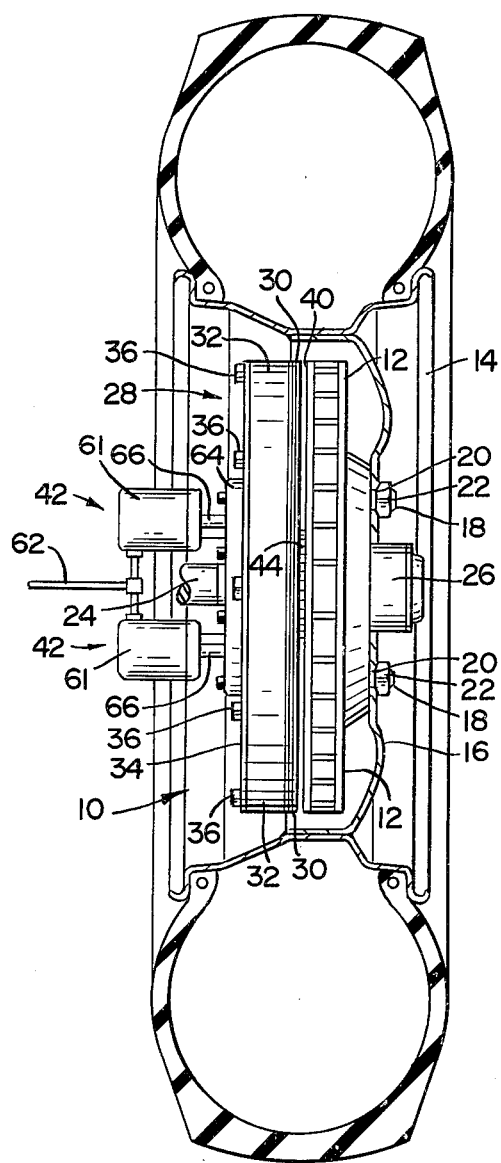
FIG. 1 is a partial sectional view showing the interior of the disc brake assembly of the present invention.
Figure 2:
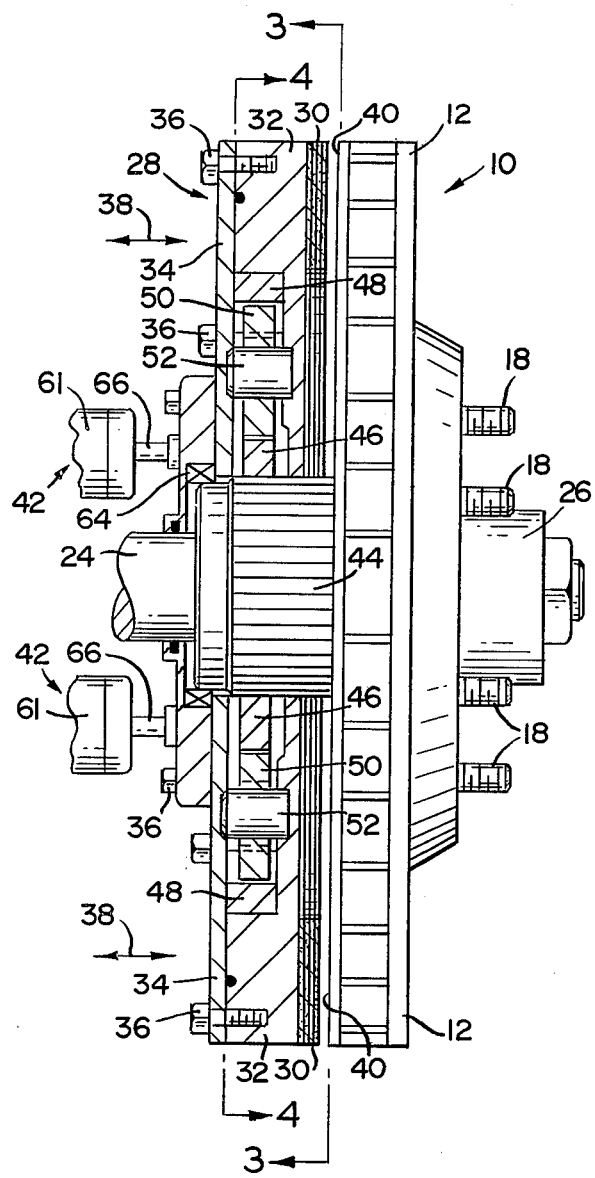
FIG. 2 is a detailed sectional view showing the interior of the lining assembly in relative disposition of the lining support means and related structural components of the present invention.

As shown in FIGS. 1 and 2, the brake assembly generally indicated as 10 comprises a disc means 12 attached to a wheel assembly 14 in the conventional manner as by mounting flange 16. A plurality of threaded bolts 18 are secured through appropriate apertures 20 and affixed thereto by conventional nut members 22. A central axle 24 runs through the rotational center of the brake assembly 10 and also has the wheel assembly mounted thereon in the conventional manner. The free end 26 of the axle 24 may form some type of conventional attachment means whereby the mounting flange 16 fits over axle portion 26 for supporting the wheel assembly 14 thereon.

As shown in FIGS. 1 and 2, the brake assembly further comprises a lining assembly generally indicated as 28 and including lining means 30 mounted on a support base or housing 32 and having an exterior cover 34 secured to the base 32 by conventional fasteners 36. As indicated by directional arrow 38, the entire lining assembly 28 is movable in a linear direction along the longitudinal axis of axle 24 into and out of frictional engagement with disc means 12. More specifically, lining means 30 frictionally engages the correspondingly positioned surface 40 of disc means 12 to provide braking action on the wheel assembly 14. Movement of the lining assembly 28 into and out of frictional engagement with disc means 12 will be described in greater detail hereinafter with specific reference to the operative means generally indicated as 42.

Figure 3:
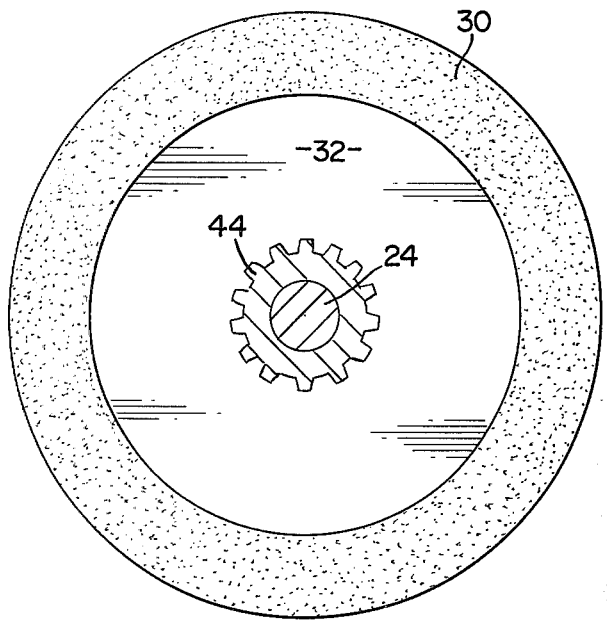
FIG. 3 is an end view taken along line 3—3 of FIG. 2 showing the lining means of the lining assembly and the lining support means.
Figure 5:
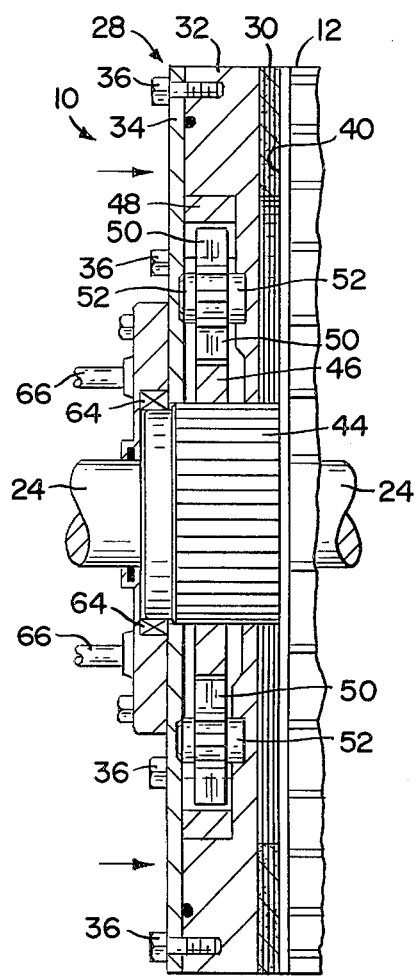
FIG. 5 is a sectional view of the embodiment shown in FIG. 2 wherein the lining means and the disc means are in frictional engagement with one another in accordance with the relative disposition of the structural elements of the subject brake assembly when in braking relation to the disc means.

As best shown in FIGS. 2, 3 and 5, the brake assembly of the present invention further comprises a lining support means in the form of a hub member 44 fixedly mounted on axle 24 so as to rotate therewith. Hub member 44 has its outer peripheral surface formed into a splined configuration as clearly shown.

Figure 4:
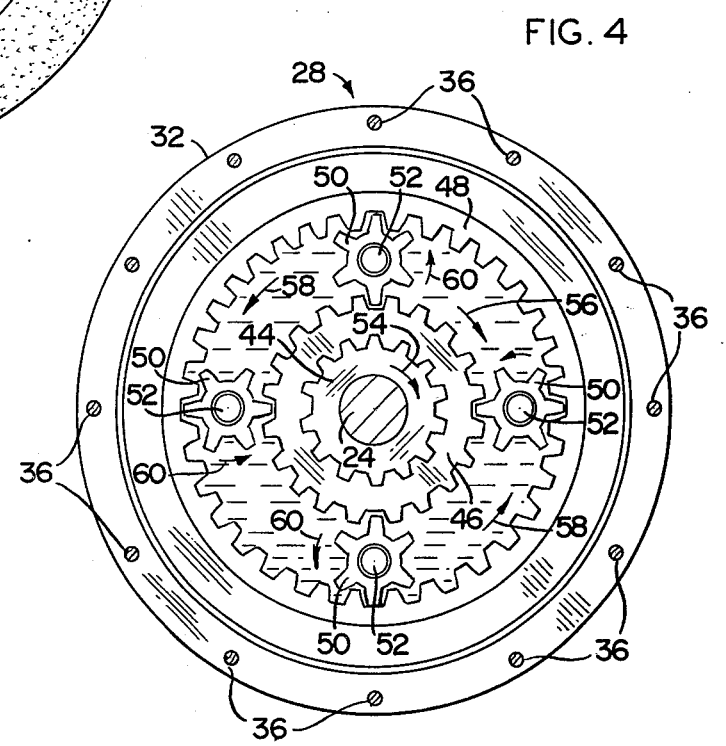
FIG. 4 is an end view taken along line 4—4 of FIG. 2 showing the interior working of the lining movement means relative to the lining assembly and the lining support means.

Lining movement means is interconnected between the lining base 32 and the hub member 44. Specifically, a hub gear 46 (FIG. 4) is concentrically mounted on hub member 44 wherein its interior surface is correspondingly configured to the outer peripheral splined surface of hub member 44. Similarly, hub gear 46 has its outer peripheral surface formed into a gear arrangement and is interconnected to an outer ring gear 48 also comprising the lining movement means. The ring gear 48 and the hub gear 46 are interconnected by one or more planetary gears 50. Each of these planetary gears are journalled for rotational movement about pins 52 mounted relative to the outer casing 34, the base 32, and the hub member 44 so as to allow relative rotational movement between the lining support means and the base 32. With specific reference to FIG. 4, rotation of axle 24 and the fixedly attached hub member 44 in the direction indicated by directional arrow 54 causes corresponding rotation of hub gear 46 as indicated by directional arrow 56. Due to the interconnection of ring gear 48 with the hub gear 46 through planetary gears 50, the outer ring gear rotates in the opposite direction to that of axle 24 as indicated by directional arrow 58. This rotation of ring gear 48 in the opposite direction is, of course, caused by the rotation of planetary gears in the direction indicated by directional arrows 60 as represented. Due to the fact that ring gear 48 is fixedly attached to base 32 by a press fit relation or the like, rotation of ring gear 48 causes rotation of the lining assembly including base plate 32 and lining means 30. In that disc means 12 is fixedly attached to axle 24, the disc will be rotating in the same rotational direction as axle 24 along with the attached wheel assembly 14. Because of the interconnecting relationship between the hub gear 46, planetary gears 50 and ring gears 48, the lining means 30 rotates in the opposite direction. Accordingly, an important feature of the present invention is the creation of increased frictional resistance between lining means 30 and surface 40 of disc means 12. This increased frictional engagement, of course, adds to the braking force exerted on disc means 12 and provides a more efficient and capable brake assembly. Based on the disclosed structure, it should be obvious that while a preferred embodiment of the present invention includes the provision of a hub gear 46, the present invention includes planetary gears 50 being movably interconnected directly between the outer surface of hub member 44 and the ring gear 48. If this structure is utilized, the outer surface of hub member 44 thereby becomes a hub gear.

Actuation of the brake assembly occurs through selective actuation of the operative means 42. The operative means comprises one or more fluid actuated piston and cylinder assemblies 61 interconnected between a fluid source (not shown) through fluid conduit 62 (FIG. 1) and bearing means 64 attached to the plate 34 as shown. The structure of the bearing 64 is such as to allow a portion thereof to rotate with the lining assembly 28. An additional portion of the bearing assembly 64 is fixedly attached to the piston members 66 whereupon actuation of the piston and cylinder assembly 60, the entire lining assembly is moved linearly as represented by directional arrow 38 along the longitudinal axis of axle 24. This brings lining means 30 into and out of frictional, braking engagement with surface 40 of disc means 12.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Now that the invention has been described, what is claimed is:

1. A disc brake assembly of the type primarily designed to brake a wheel assembly or like object, said brake assembly comprising: disc means connected to the wheel assembly, lining assembly including lining means disposed in engagable position relative to said disc means, lining support means disposed in interconnecting relation between said lining assembly and said disc means, said lining support means further comprising hub means, operative means connected to said lining assembly and positioned to movably dispose said lining means into and out of frictional engagement with said disc means, lining movement means rotatably interconnected between said lining assembly and said lining support means, said lining movement means comprising gear means including a hub gear mounted on said hub means to rotate therewith, ring gear means fixedly secured to said lining means so as to rotate therewith, satelite gear means interconnected therebetween in an intermeshing engagement with both said ring gear means and said hub gear, whereby rotation of said hub gear causes rotation of said lining means in the direction opposite to that of said hub means and said connected disc means.

2. A disc brake assembly as in claim 1 further comprising bearing means interconnected between said lining assembly and said operative means, said lining assembly rotatably connected to said operative means through said bearing means.

3. A disc brake assembly as in claim 2 wherein said bearing means further comprises a first portion attached to said lining assembly for rotational movement therewith, a second portion fixedly attached to said operative means, said first and second portion movably interconnected to one another, whereby both linear and rotational movement of said lining assembly relative to said lining support means is accomplished upon actuation of said operative means.

4. A disc brake assembly as in claim 1 wherein said operative means comprises fluid actuated means interconnected between said lining assembly and a source of fluid, whereby actuation of said fluid actuation means positions said lining assembly into and out of operative, frictional engagement with said disc means.

* * * * *